UNITED STATES PATENT OFFICE.

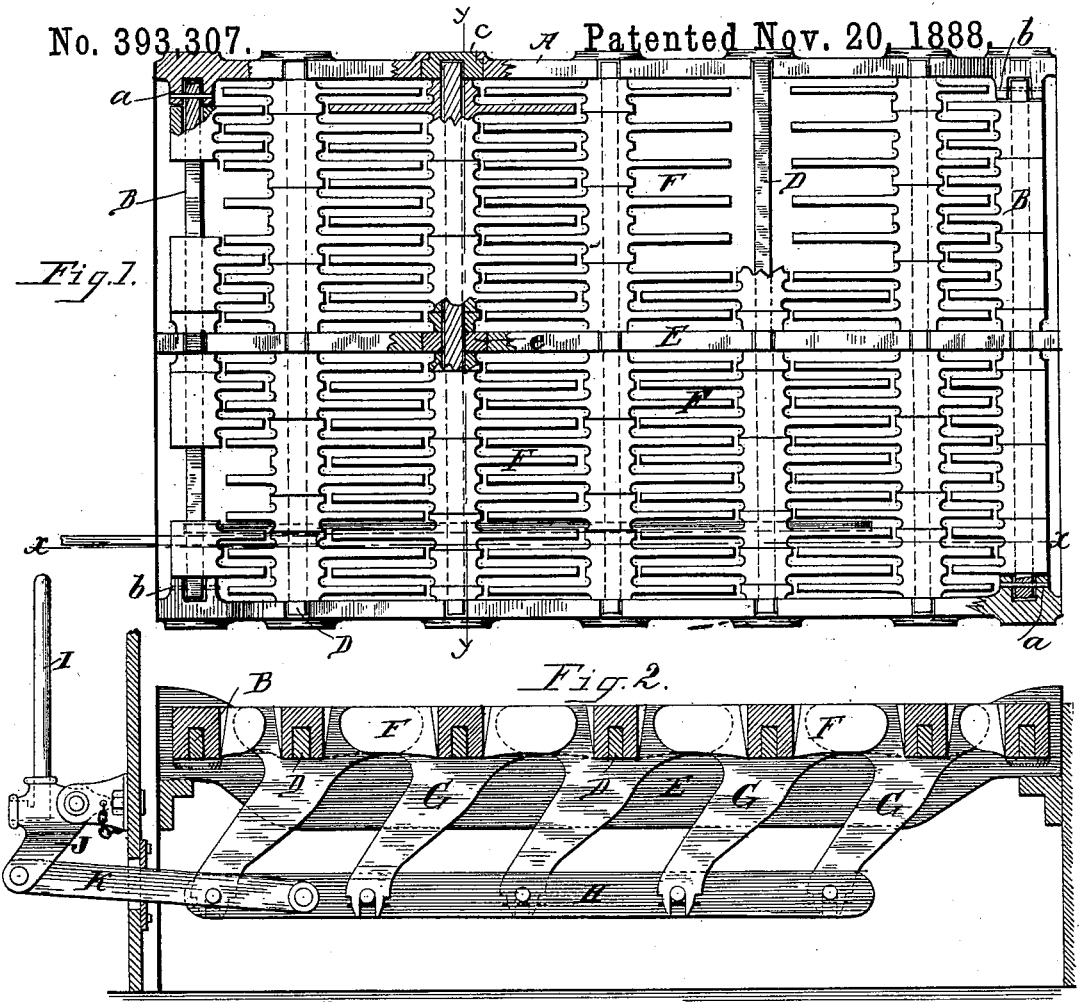

THOMAS KIRKWOOD, OF NEW YORK, N. Y.

GRATE FOR FURNACES.

SPECIFICATION forming part of Letters Patent No. 393,307, dated November 20, 1888.

Application filed November 4, 1887. Serial No. 254,287. (No model.) Patented in England July 12, 1887, No. 9,797.

*To all whom it may concern:*

Be it known that I, THOMAS KIRKWOOD, a citizen of the United States, and a resident of the city of New York, county and State of New York, have invented certain new and useful Improvements in Grates for Furnaces, of which the following is such a full, clear, concise, and exact description as will enable others skilled in the art to which my invention appertains to make and use the same, reference being had to the accompanying drawings, forming part of this specification.

My invention relates more especially to that class of grates for furnaces known as "shaking-grates."

The object of my invention is to construct a grate which will not be liable to be injured nor have its operation impeded by reason of contraction or expansion of the metal, and provided with suitable bearings and connections whereby the fuel-bars may be rocked and oscillated and the fire shaken and dumped without danger of disconnecting or disarranging the movable parts, at the same time the different sections admitting of easy removal for the purposes of renewal and repair.

To accomplish this object, I form the side bars of the grate with inner projecting lugs or seats for holding the end bars and with circular flanged bearings in which are placed independent trunnions formed with collars or flanges and provided with slots for receiving the cross-bars, which bars may also pass through slotted trunnions having circular bearings in a central supporting-bar. Upon the end bars are preferably placed independent fuel-bars, as well as upon the cross-bars, and to the cross-bars are secured attachments for imparting an oscillating motion to the same, as has hitherto been done; and the invention consists in the devices and combination of devices, as hereinafter more fully described, and pointed out in the claims.

In the accompanying drawings, Figure 1 is a plan view of a grate embodying my improvement, with some of the independent fuel-bars removed from the supporting-bars; also with certain other parts broken away, showing horizontal sections of trunnioned bearings in side bars and central supporting-bar, as well as the inner lugs or seats on side bars for holding the end bars. Fig. 2 is a section of the same taken on the line *x x* of Fig. 1, and showing in side elevation rocking plates and oscillating bar. Fig. 3 is a vertical cross-section taken on the line *y y* of Fig. 1. Figs. 4 and 5 are different views of collared trunnions detached; and Fig. 6 is a sectional and plan view of one of the trunnions without collar, as adapted to rest in bearing in central supporting-bar. Fig. 7 is a plan view of two of the independent fuel-bars cast together, and Fig. 8 is a section taken on the line *z z* of Fig. 7. Fig. 9 is a view in side elevation of one of the rocking plates removed from the cross-bar, and Fig. 10 is a perspective view of a portion of one of the side bars with inner projecting lug or seat.

The side bars, A, are provided near their ends with lugs or seats *a*, having recesses or pockets for receiving the end bars, B, which end bars may simply rest in the seats *a* or be further secured by pins or bolts *b*, passing through holes in the sides of the seats and corresponding holes in the bars. In the side bars are also formed circular flanged bearings, in which are placed collared or flanged trunnions *c*, openings being made above the bearings and the trunnions being provided on their inner sides with slots or recesses for receiving the ends of the cross-bars D, which bars preferably pass through slotted trunnions *e* in a central supporting-bar, E. The trunnions *e*, however, are not formed with collars, as the trunnions *c*, as they are held in place on either side by the independent fuel-bars F resting on the cross-bars. Fuel-bars are also placed upon the end bars in a similar manner as upon the cross-bars. The fuel-bars may be cast in series of two or more, and are preferably provided with intermediary projections receding downward, which allow the points to be brought close together and the effect of continuous bars secured for supporting the fuel without impeding the oscillation of the sections.

It will be observed that the slots or recesses of the trunnions *c* are open on top or upwardly, as are also the slots of the trunnions *e*, so that the cross-bars D can be placed in position simply by dropping them into the said trunnions, and can be removed, when desired, simply by lifting them out of the open slots of the trunnions, and thus endwise movement of the said cross-bars, either in placing them in position or in removing them, will be avoided.

To the cross-bars are also secured rocking plates G, which plates connect with a general oscillating bar, H, and the grate is rocked or dumped by means of the shaker-handle I, acting through the lever J and link K. In a grate so constructed the seats a form a support for the end bars without necessitating cutting slots in the side bars, and thereby weakening the same near their ends, where there is the least metal, and as the end bars are provided with separate independent fuel-bars there is but little danger of injury from warping or contraction and expansion of the metal near the fire. Moreover, the collared trunnions, while admitting of easy removal, securely hold the cross-bars, and the grate may be shaken and dumped without danger of their being thrown from their places; also, the central bar with the circular trunnions therein forms a further support for the cross-bars without impeding their movement, thus combining strength with the necessary elements of easy oscillation.

Having thus described my invention, what I claim as new, and desire to secure by Letters Patent, is—

1. In a grate for furnaces, end bars, in combination with side bars having near their ends inwardly-projecting lugs provided with recesses or pockets to receive the ends of the said end bars and retain them positively in place, substantially as set forth.

2. In a grate for furnaces, the combination, with cross-bars, of side bars provided with flanged bearings, and independent trunnions fitted in said bearings and having flanges or collars, and being also provided on their inner sides with slots or recesses to receive the ends of the said cross-bars, substantially as set forth.

3. In a grate for furnaces, the combination, with cross-bars and a central supporting-bar having bearings, of the trunnions e, fitted in said central bar and having slots which are open upwardly to receive the said cross-bars, and the fuel-bars F, serving to hold the said trunnions in place, substantially as set forth.

4. In a grate for furnaces, the combination, with cross-bars, of side bars provided with bearings, trunnions c, fitted in said bearings and having upwardly-open slots or recesses to receive the ends of the said cross-bars, a central supporting-bar having bearings, the trunnions e, fitted in said bearings and having upwardly-open slots to receive the said cross-bars, and the fuel-bars F, serving to hold the said trunnions e in place, substantially as set forth.

THOMAS KIRKWOOD.

Witnesses:
R. G. MONROE,
HUBERT A. BANNING.